(12) United States Patent
Carati et al.

(10) Patent No.: US 6,924,247 B2
(45) Date of Patent: Aug. 2, 2005

(54) METHOD FOR THE SEPARATION OF ZEOLITES

(75) Inventors: Angela Carati, San Giuliano Milanese (IT); Giannino Pazzuconi, Broni (IT); Carlo Perego, Carnate (IT); Oscar Cappellazzo, Alghero (IT); Gianni Girotti, Novara (IT)

(73) Assignees: Eni S.p.A., Rome (IT); Enichem S.p.A., San Donato Milanese (IT); Enitecnologie S.p.A., San Donato Milanese (IT)

( * ) Notice: Subject to any disclaimer, the term of this patent is extended or adjusted under 35 U.S.C. 154(b) by 101 days.

(21) Appl. No.: 10/014,853

(22) Filed: Dec. 14, 2001

(65) Prior Publication Data

US 2002/0113015 A1 Aug. 22, 2002

(30) Foreign Application Priority Data

Dec. 21, 2000 (IT) .......................... MI00A2772

(51) Int. Cl.$^7$ ............................... B01J 29/06
(52) U.S. Cl. .......................... 502/64; 502/60
(58) Field of Search ..................... 502/60, 64

(56) References Cited

U.S. PATENT DOCUMENTS

| | | | | |
|---|---|---|---|---|
| 4,260,495 A | * | 4/1981 | Bennoit et al. | 210/772 |
| 5,866,744 A | * | 2/1999 | Wu et al. | 585/486 |
| 5,919,721 A | * | 7/1999 | Potter | 502/64 |
| 6,106,803 A | * | 8/2000 | Hasenzahl et al. | 423/705 |

FOREIGN PATENT DOCUMENTS

| | | |
|---|---|---|
| DE | 100 59 520 | 5/2001 |
| EP | 0 893 158 | 1/1999 |
| FR | 2 392 933 | 12/1978 |

OTHER PUBLICATIONS

Translation of DE 100 59 520, published May 17, 2001.*

* cited by examiner

Primary Examiner—Kiley Stoner
Assistant Examiner—Christina Ildebrando
(74) Attorney, Agent, or Firm—Oblon, Spviak, McClelland, Maier & Neustadt, P.C.

(57) ABSTRACT

The object of the present invention relates to a simple, rapid and inexpensive process for effecting solid-liquid separations in the case of zeolites, also having small crystals. This process, which is particularly useful for the recovery of zeolite crystals in suspension in the crystallization water, comprises treating this suspension of crystals with an acid or one of its precursors and subjecting the resulting mixture to filtration or decanting.

According to a particular aspect of the invention, the crystalline phase is separated in a mixture with oxides which can be used as ligands. Said oxides can be generated by the reagents of the zeolite preparation reagent mixture, not transformed into crystalline phase during the synthesis hydrothermal treatment, or they can be added to the suspension of crystals before the separation treatment, or again they can be generated by precursors suitably added to the crystallization slurry.

20 Claims, No Drawings

METHOD FOR THE SEPARATION OF ZEOLITES

The present invention relates to a method for processing synthetic zeolites, i.e. for recovering zeolite crystals, also having dimensions of less than 500 Å, from solid/liquid dispersions containing them.

Zeolites can be used as molecular sieves and as catalysts in refining and in the chemical and petrochemical industry. It is known that the catalytic performances of zeolites are correlated to their crystalline structure and their composition. With the same parameters, however, very different performances can be obtained, depending on the morphology of the crystalline phase. The activity of a zeolitic catalyst increases with a decrease in the dimensions of the crystals: this probably depends on diffusive factors which influence the reactivity or favour the formation of heavy products which cause fouling, i.e. obstruction of the zeolitic pores. GB 1402981, for example, describes the increase in the stability of ZSM-5, characterized by crystallites having dimensions of 0.005–0.1 μm, in the transformation of hydrocarbons.

A.J.P.H. van der Pol et al., in Appl. Catal. A 92 (1992) 113, correlate the crystal dimension of zeolites with the catalytic activity, in the hydroxylation of phenol with TS-1. EP 242960 describes that by using metal-silicates with a zeolitic structure, characterized by an external surface area>5 $m^2/g$ and crystallites<0.5 μm, the yields to ε-caprolactam in Beckmann's catalytic rearrangement are improved.

The formation of crystals with varying dimensions can be obtained by suitably modulating the composition of the synthesis gel and hydrothermal treatment conditions (F. Di Renzo, Catalysis Today, 41 (1998) 37). The production of zeolites with small dimensional crystals is generally obtained with synthetic methods which tend to favour the nucleation process with respect to that of the growth of crystals.

The zeolitic phase, however, cannot be used as such as catalyst. If, on the one hand, the small dimensions of the zeolite crystallites favour the intraparticle diffusion of the reagents and reaction products and allow good catalytic performances to be obtained, on the other hand, similar dimensions are not compatible with normal industrial reactor solutions. To overcome this problem, the zeolites are bound with suitable ligands, selected from oxides and their mixtures (for example alumina, silica-alumina, silica) or clays. The preparation methods of bound zeolites must be such that they do not cause blockage of the zeolitic cavities which would obviously result in a decrease in the catalytic activity.

The possibility of simplifying the overall preparation of the catalyst made up of the active phase and ligand is described for example in EP 906784 and MI 99 0024538 for the preparation of catalysts in spheres for applications in slurry or fluid bed reactors. In the processes described, the separation phase of the zeolite is avoided.

In other cases, above all when further treatment on the zeolitic phase in powder form is necessary, as, for example, when the zeolite must be used in extruded form in a fixed bed reactor, the separation of the zeolitic phase from the mother liquor or washing water or possible ionic exchange water during the processing or preparation of a catalyst, cannot be avoided.

The separation of the zeolite is, from an industrial point of view, a problem, especially when operating with a "small" crystal zeolite (submicronic agglomerates, mainly from 500 to 5000 Å; crystals from 100–500 Å), which cannot be separated from the synthesis medium with the usual techniques. There are numerous main parameters which can make the separation of the crystalline phase critical. The following can be mentioned for example: the intrinsic dimension of the crystals and/or agglomerates, their dimensional homogeneity, the presence of silica in the colloidal state in the mother liquor, as a result of a crystallization yield of less than 100% with respect to $SiO_2$.

Zeolites with large crystals can be separated from a liquid phase by filtration in reasonable times (for example the declared filtering threshold for pressure filters, which depends on the cloths used, can vary from 5 to 300 μm), whereas this is not always possible for a zeolite with small crystals, as either the solid agglomerates on the filter, excessively slowing down the passage of the liquid through the panel formed thereby or it passes through the filter without being withheld.

In these cases, the solid-liquid separation can be obtained by means of centrifugation, but this method is long and costly. In addition, although the solid panel separated from the centrifuge is apparently compact, it gives marked thixotropic phenomena. This means that the solid, when handled, takes on the characteristics of a liquid, with all the drawbacks relating thereto.

There are also methods based on micro-filtration which use membrane cartridges, such as those described for example in patent WO93/06917. In all cases, these methods require the use of specific equipment for the purpose.

A simple, rapid and inexpensive process has now been found for effecting solid-liquid separations also in the case of small crystal zeolites. With this new method, the zeolite crystals, also with dimensions of less than 500 Å, can be isolated by means of simple decanting or filtration which can carried out in very fast times.

The object of the present invention therefore relates to a process for separating zeolite crystals from aqueous environments containing them in suspension, which comprises:
(a) treating this suspension of crystals with an acid up to a pH ranging from 3 to 8;
(b) subjecting the resulting mixture to filtration or decanting to isolate the crystals.

In particular, this process can be applied to zeolite crystals in suspension in the crystallization mother liquor and, by modification of the composition of the mixture, it allows the zeolitic phase to be separated from the mother liquor by filtration or decanting.

A particular aspect of the present invention is therefore a process for the recovery of zeolite crystals in suspension in the crystallization water which comprises:
(a) treating this suspension of crystals with an acid up to a pH ranging from 3 to 8;
(b) subjecting the resulting mixture to filtration or decanting to isolate the crystals.

For the process of the present invention, organic or inorganic, Broensted or Lewis type acids can be used. Suitable acids which can be used are acetic acid, hydrochloric acid, nitric acid, formic acid, propionic acid and oxalic acid. The pH of step (a) preferably ranges from 3 to 6. The acids are used in aqueous solutions having a concentration ranging from 0.05 to 10 N.

All zeolites are suitable for being separated from the crystallization mother liquor according to the method of the present invention. For example, zeolites with small pores which can be separated according to the method of the present invention are ANA, CHA, ERI, GIS, LEV, LTA, MTN, PHI, RHO, SOD; zeolites with medium pores can be EUO, FER, MFI, MEL, MTT, TON, MFS, NES; zeolites with large pores can be BEA, FAU, MTW, MOR, OFF, MAZ, LTL, GME, EMT; zeolites with extra-large pores can be CFI and DON.

Another particular aspect of the present invention is that the crystalline phase is separated in a mixture with oxides which can be used as ligands in the subsequent extrusion treatment.

Said oxides can be generated by the reagents of the zeolite preparation reagent mixture, not transformed into crystalline phase during the synthesis hydrothermal treatment, or they can be added to the suspension of crystals before the separation treatment, or again they can be generated by precursors suitably added to the crystallization slurry.

In the first case, the method has the additional advantage of quantitatively exploiting the silica, alumina and/or other metal oxide sources used in the preparation phase of the reagent mixture.

In the second case, an aqueous suspension containing clay, a silicon oxide, a silica-alumina or an alumina (for example bohemite) is also added to the zeolite suspension in the mother liquor.

In the third case, precursors of silica, silica-alumina, alumina, such as for example aluminum acetylacetonate, alkylaluminates and/or alkylsilicates are added to the suspension of zeolite crystals in the mother liquor, which, by addition of the acid according to the present invention, produce a rapid aggregation of the colloidal phases formed and the precipitation of the corresponding oxides. According to a particular aspect of the present invention, the acid in step (a) can be added by means of a precursor capable of contemporaneously generating, by hydrolysis, both the acid and an oxide suitable for being used as a ligand. Appropriate precursors for this purpose can be $Al(NO_3)_3$, $Al(SO_4)_3$, silicic acid, silicon or aluminum halides, $Al(CH_3COO)_3$.

The quantity of oxides co-present with the zeolite, which are isolated at the end of the separation process according to the particular aspects described above of the present invention, can vary from 1 to 50% by weight with respect to the zeolite.

After the treatment with acid up to a pH ranging from 3 to 8, and optional addition of ligand oxides, or their precursors, demineralized water can be added to the mixture, which is stirred, left to deposit and the supernatant liquid separated. In this way, it is possible to effect solid-liquid separations by decanting, using a simple method and without having to resort to particular equipment.

According to another possibility, the same separations can be carried out by filtration instead of by decanting.

A further advantage of the method described consists in the fact that the acid treatment also allows a partial exchange of the zeolite into acid form, in a single passage. In this phase, a zeolite can, in fact, be obtained in partially acid form, leaving a contact time which is sufficient to effect the ionic exchange between the $H^+$ ion and alkaline or alkaline earth metal present in the zeolite. The entity of the exchange depends on the accessability of the cationic exchange sites; for example for zeolites with large pores, it is at least 30%.

This allows a significant reduction in the unitary operations required for the processing of zeolites, processing referring to the washing of a zeolite to purify it from the crystallization mother liquor and all the subsequent operations for obtaining catalysts, such as ionic exchanges, for example.

When operating according to the known art, the processing of a zeolite to obtain its acid or ammonia form comprises the following operations:

1. Separation of the solid crystalline phase from the crystallization slurry by means of filtration or centrifugation;
2. Washing by re-dispersion in water;
3. Separation of the zeolite by means of filtration or centrifugation;
4. Drying;
5. Calcination to remove the organic templating agent (e.g. quaternary alkylammonium ion);
6. Exchange in aqueous solution containing an acid or an ammonium salt;
7. Separation of the zeolite by means of filtration or centrifugation, accompanied by washing to remove the excess acid or ammonium salt and the corresponding exchange products;
8. Drying;
9. Calcination to remove the ammonium ion, when the exchange has been carried out with an ammonium salt and the acid form is required.

Operations 6 and 7 are normally repeated in relation to the exchange level desired. For residual alkaline metal values lower than 150 ppm they are normally repeated at least twice.

Operating according to the method of the present invention, the sequence of processing operations for obtaining the zeolite in ammonia or acid form becomes:

(a) treating the suspension of zeolite crystals in the crystallization mother liquor containing them with an aqueous solution of acid up to a pH ranging from 3 to 8;
(b) subjecting the resulting mixture to decanting or filtration to separate the zeolite crystals;
(c) drying;
(d) calcination to remove the templating agent;
(e) exchange in an aqueous solution containing an acid or ammonium salt;
(f) separating the zeolite by means of filtration or decanting, accompanied by washing to remove the excess acid or ammonium salt and the corresponding exchange products;
(g) drying;
(h) calcination to remove the ammonium ion, when the exchange has been carried out with an ammonium salt and the acid form is required.

The zeolite crystals separated under point (b) do not require further washing.

Thanks to the exchange contribution of phase (a), steps (e) and (f) must be effected only once to guarantee residual alkaline or earth-alkaline alkaline earth metal values lower than 150 ppm.

When operating according to the method of the present invention, there are fewer and more rapid separation operations as the acid treatment effected speeds up both the filtration of the zeolite crystals from the suspension in the mother liquor, and also the subsequent filtrations following washing or ion exchange treatment.

In the particular case in which the zeolites are characterized by tridimensional large pore or extra-large pore systems, such as BEA, FAU, MOR, for example, the processing scheme is even more simplified:

(a) treating the suspension of zeolite crystals in the crystallization mother liquor containing them with an acid up to a pH ranging from 3 to 8;
(b) subjecting the resulting mixture to decanting or filtration to separate the zeolite crystals;

(c) exchanging the zeolite with an aqueous solution containing an acid or ammonium salt (the calcination phase to remove the organic templating agent is not necessary);

(d) separating the zeolite by filtration or decanting;

(e) drying;

(f) calcination to remove the residual templating agent and the ammonium ion, when the exchange has been carried out with an ammonium salt.

The zeolite crystals obtained according to one of the two schemes provided above can be subsequently subjected to extrusion, after the addition of a suitable ligand, to obtain catalysts which can be used in fixed bed reactors.

In all the cases considered, the last calcination phase can be effected before or after extrusion.

When, in step (a) of the above schemes, an oxide suitable for being used as a ligand, or a precursor of said oxide or an acid precursor and oxide, has been added, the resulting mixture of step (e) can be directly fed to the extruder even without the further addition of a ligand.

Also when, in step (a), the precipitation of the zeolite preparation reagents not transformed into crystalline phase, is obtained, the resulting mixture of step (e) can be directly fed to the extruder even without the further addition of a ligand.

EXAMPLE 1 (PREPARATION OF BETA ZEOLITE)

4.4 kg of tetra-ethylammonium hydroxide at 40% by weight, in aqueous solution, are added to 2.4 kg of demineralized water. 0.24 kg of sodium aluminate at 56% by weight of $Al_2O_3$ are subsequently added, with continual stirring until a limpid solution is obtained. 6.0 kg of Ludox HS 40 colloidal silica at 40% of $SiO_2$ are added to this solution. A homogeneous suspension is thus obtained, which is charged into an AISI 316 steel autoclave equipped with an anchor stirrer. The gel is left to crystallize under hydrothermal conditions at 180° C. for 30 hours. The autoclave is cooled and the suspension of zeolite crystals in mother liquor is discharged for the subsequent processing step.

EXAMPLE 2

1 kg of the suspension obtained from the previous example is treated with about 300 g of 3 N acetic acid. The addition of the acid is effected under stirring, by subdividing the acid into several aliquots and leaving a few minutes between the addition of the various portions. The pH proves to be about 5. At this stage, a rather dense suspension is obtained to which 7 litres of demineralized water are added. When the stirring is interrupted, it can be observed that the whole solid is deposited in a few minutes, leaving a limpid supernatant liquid, and can be easily separated by filtration.

The solid thus obtained is analyzed with the XRD technique, and proves to consist of beta zeolite.

EXAMPLE 3

The beta zeolite crystals isolated by filtration as described in example 2, are re-dispersed in a solution of demineralized water and ammonium acetate, as described in the known art. The beta zeolite is left, under stirring, in contact with one of these solutions, at room temperature, for about 3 hours and the whole mixture is then set for filtration on a common flat filter with a filter cloth, under nitrogen pressure. The panel is washed with water.

The humid panel obtained consists of beta zeolite in ammonia form.

To obtain the zeolite in acid form, the solid is dried at 150° C. and is then calcined at 550° C. for 5 hours in air.

Chemical analysis on the calcined zeolite gave the following results: Al 2.68%; Na 100 ppm; molar ratio Al/Na 228.

EXAMPLE 4

The beta zeolite crystals isolated as described in example 2 are calcined before being exchanged with a solution of ammonium acetate, filtered, washed and re-calcined as described in example 3. In this case, chemical analysis effected on the final zeolitic sample in acid form gave the following results: Al 2.57%; Na 106 ppm; molar ratio Al/Na 206.

On comparing the results of examples 3 and 4, it can be seen that it is possible to exchange the sodium with $H^+$ or $NH_4^+$ without first eliminating the templating agent by calcination.

EXAMPLE 5—COMPARATIVE

1 Kg of zeolite suspension in the mother liquor obtained in example 1 is processed according to the traditional procedure, i.e. by means of solid-liquid separation effected by filtration.

The filtration proves to be 5 times slower than the filtration carried out in example 2 after acid treatment.

The zeolite is washed with demineralized water until the washing water has a pH of 9. At this point, it is dried at 150° C. and calcined for 5 hours in air at 550 ° C. The solid is then subjected to double exchange with ammonium acetate in aqueous solution (according to the procedure of the known art), with separation by filtration and washing with water.

The sample is then dried in an oven at 150° C. and calcined for 5 hours at 550° C. in air. Beta zeolite in acid form is thus obtained. Elemental chemical analysis on the latter sample gave the following results: Al 2.51%; Na 98 ppm; molar ratio Al/Na 218.

On comparing the results obtained in examples 3, 4 according to the invention and comparative example 5, in relation to the quantity of residual sodium, it can be deduced that the quality of the samples obtained is equivalent, but the procedure of the present invention allows a simpler and more rapid operation, as, in fact, there are fewer passages and the filtration times are shorter.

EXAMPLE 6 (PREPARATION OF ZSM-12 ZEOLITE)

185 g of tetra-ethylammonium hydroxide at 40% by weight, in aqueous solution, are added to 100 g of demineralized water. 4 g of sodium aluminate at 56% by weight of $Al_2O_3$ are subsequently added. The limpid solution thus obtained is poured, under stirring, into 500 g of Ludox HS 40 colloidal silica. After brief stirring, a limpid and homogeneous gel is obtained, which is poured into an AISI 316 steel autoclave equipped with an anchor stirrer. The gel is left to crystallize under hydrothermal conditions at 160° C. for 60 hours. At this point, the autoclave is cooled. The suspension obtained is homogeneous with a lactescent appearance.

EXAMPLE 7 (COMPARATIVE)

100 g of the suspension of example 6 are filtered. The solid discharged is washed by re-dispersion in water, re-centrifuged, dried and calcined at 550° C.

Upon X-ray diffraction analysis, the solid obtained proves to consist of pure ZSM-12. Upon TEM analysis the zeolite proves to have spherical crystalline agglomerates with dimensions of 0.1–0.3 µm.

Chemical analysis provides a molar ratio $SiO_2/Al_2O_3=94$ and $Na/Al=0.79$. The treatment parameters and results obtained are indicated in Table 1.

EXAMPLE 8

100 g of the crystallization suspension of example 6 are treated with acetic acid, as described in example 2, obtaining a pH of about 5, and is then subjected to filtration to separate the solid which is subsequently dried and calcined. The sample obtained is characterized by the following molar composition: $SiO_2/Al_2 O_3=97$ and $Na/Al=0.4$, thus revealing the removal of about 50% of the sodium present as counter-ion in the zeolite. The treatment parameters and results obtained are indicated in Table 1.

EXAMPLE 9

Example 8 is repeated using aluminum nitrate which by hydrolysis contemporaneously causes the formation of aluminates and nitric acid.

The test is carried out using a quantity of $Al(NO_3)_3 9H_2O$ equal to 27 g. The treatment parameters and results obtained are indicated in Table 1.

EXAMPLE 10

Example 9 is repeated with a quantity of $Al(NO_3)_3 9H_2O$ equal to 14 g.

Table 1 below summarizes the tests effected. The acid compounds added to the slurry are indicated, together with its final pH and the time necessary for its filtration. The time necessary for the filtration of the crystallization suspension obtained in example 6 and not subjected to acid treatment according to the present invention, is provided as a comparison.

TABLE 1

| EXAMPLES | Acid | pH | Filtration time (min) | solid %* |
|---|---|---|---|---|
| 7 | — | 12.1 | 30 | 100 |
| 8 | $CH_3COOH$ | 4.9 | 5 | 104 |
| 9 | $Al(NO_3)_3$ | 3.1 | 13 | 117 |
| 10 | $Al(NO_3)_3$ | 6.0 | 3 | 111 |

*normalized with respect to the solid obtained by centrifugation

From the results indicated in the table, it is evident that the acid, or acid precursor, added to the suspension of zeolite crystals in the crystallization mother liquor, favours the solid-liquid separation and allows the recovery of the crystals by filtration in much faster times.

This method is also extremely compatible with a subsequent forming process: it allows, in fact, the non-reacted silica during the crystallization process of the zeolite (example 8) and the alumina deriving from the hydrolysis of the acid precursor (examples 9 and 10), to be exploited as ligands.

What is claimed is:

1. A method for separating zeolite crystals from an aqueous medium, comprising:
   (a) preparing an aqueous alkaline mother liquor containing, as reagents for zeolite preparation, a silica source, optionally alumina and/or other metal oxide sources and/or an organic templating agent;
   (b) hydrothermally treating said mother liquor thereby obtaining a suspension containing: - zeolite crystals, reagents of the zeolite preparation not transformed into zeolitic crystalline phase during the hydrothermal treatment and optionally oxides generated by them, optionally organic templating agent and optionally product generated by the decomposition of said sources of silica and alumina;
   (c) treating the zeolite crystal containing suspension with an acid until the suspension attains a pH ranging from 3–8; and
   (d) filtering or decanting the resulting mixture to isolate the zeolite crystals in mixture with oxides generated by said reagents of the zeolite preparation not transformed into zeolitic crystalline phase.

2. The process according to claim 1, which further comprises:
   in step (c) treating the suspension with said acid and with a material selected from the group consisting of a clay, an oxide and a precursor of an oxide which generates the oxide by hydrolysis; and
   in step (d) filtering or decanting the resulting mixture to isolate said zeolite crystals in a mixture with the oxide.

3. The process according to claim 2, wherein said oxide is selected from the group consisting of silica, silica-alumina and alumina.

4. The process according to claim 2, wherein said precursor of an oxide is selected from the group consisting of aluminum acetylacetonate, alkylaluminates, alkylsilicates and combinations thereof.

5. The method according to claim 2, wherein the content of said oxide in the separated zeolite product ranges from 1 to 50% by weight based on the amount of zeolite.

6. The process according to claim 1, wherein said acid of step (c) is an acid precursor which is capable of simultaneously generating an acid and a binder by hydrolysis.

7. The process according to claim 6, wherein said precursor which simultaneously generates acid and said oxide is selected from the group consisting of $Al(NO_3)_3$, $Al_2(SO_4)_3$, silicic acid, silicon or aluminum halides and $Al(CH_3COO)_3$.

8. The method according to claim 6, wherein the content of said oxide in the separated zeolite product ranges from 1 to 50 % by weight based on the amount of zeolite.

9. The process according to claim 1, wherein said pH ranges from 3 to 6.

10. The process according to claim 1, wherein said acid is selected from the group consisting of acetic acid, hydrochloric acid, nitric acid, formic acid, propionic acid and oxalic acid.

11. The method according to claim 1, wherein the content of said oxide in the separated zeolite product ranges from 1 to 50 % by weight based on the amount of zeolite.

12. A method for separating zeolite crystals from an aqueous medium, comprising:
   (a) preparing an aqueous alkaline mother liquor containing alumina and silica precursors and optionally an organic templating agent;
   (b) hydrothermally treating said mother liquor thereby obtaining a suspension containing zeolite crystals, silicates or amorphous silica aluminate and
   optionally (i) organic templating agent and product generated by decomposition of the organic templating agent and optionally (ii) alcohol derived by the decomposition of said silica and alumina precursors;
   (c) treating the alkaline zeolite crystal containing suspension with an acid until the suspension attains a pH ranging from 3-8; and (d) filtering or decanting the resulting mixture to isolate the zeolite crystals.

13. A process for preparing zeolite catalysts in acid or ammonia form, which comprises:
   (a) preparing an aqueous alkaline mother liquor containing, as reagents for zeolite preparation, a silica source, optionally alumina and/or other metal oxide sources and/or an organic templating agent;
   (b) hydrothermally treating said mother liquor thereby obtaining a suspension containing: - zeolite crystals, reagents of the zeolite preparation not transformed into zeolitic crystalline phase during the hydrothermal treatment and optionally oxides generated by them, optionally organic templating agent and optionally product generated by the decomposition of said sources of silica and alumina;
   (c) treating the suspension of zeolite crystals in the crystallization mother liquor containing the crystals with an aqueous acid solution to change the pH to a pH ranging from 3-8;
   (d) filtering or decanting the resulting mixture to separate the zeolite crystals in mixture with oxides generated by said reagents of the zeolite preparation not transformed into zeolitic crystalline phase;
   (e) drying the crystals;
   (f) calcining the crystals;
   (g) effecting an ion exchange in the zeolite crystals in an aqueous solution containing an acid or ammonium salt;
   (h) filtering or decanting the ion exchange zeolite crystals and subjecting the crystals to washing;
   (i) drying the crystals; and
   (j) calcining the crystals to remove ammonium ion therefrom in the event said ion exchange is conducted with ammonium salt and the acid form of the zeolite catalyst is required.

14. The process according to claim 13, wherein in step (c), said suspension is treated with a material selected from the group consisting of clay, an oxide and an oxide precursor that generates an oxide by hydrolysis.

15. The process according to claim 13, wherein said acid in step (c) is added in the form of a precursor which generates said acid and an oxide by hydrolysis.

16. A process for preparing zeolitic catalysts in acid form, which comprises:
   (a) preparing an aqueous alkaline mother liquor containing, as reagents for zeolite preparation, a silica source, optionally alumina and/or other metal oxide sources and/or an organic templating agent;
   (b) hydrothermally treating said mother liquor thereby obtaining a suspension containing: - zeolite crystals, reagents of the zeolite preparation not transformed into zeolitic crystalline phase during the hydrothermal treatment and optionally oxides generated by them, optionally organic templating agent and optionally product generated by the decompostion of said sources of silica and alumina;
   (c) treating the alkaline suspension of zeolite crystals in the mother liquor with an acid until the suspension attain a pH ranging from 3 to 8 ;
   (d) filtering or decanting the resulting mixture to isolate the zeolite crystals; in mixture with oxides generated by said reagents of the zeolite preparation not transformed into zeolitic crystalline phase;
   (e) exchanging the zeolite with an aqueous solution containing an acid or ammonium salt;
   (f) filtering or decanting the zeolite crystals to effect separation thereof;
   (g) drying the zeolite crystals; and
   (h) calcining the crystals to remove templating agent and ammonium ion in the event ion exchange reaction is conducted with an ammonium salt, the zeolite product having a tridimensional large or extra-large pore system.

17. The process according to claim 16, wherein step (c), said suspension is treated with a material selected from the group consisting of clay, an oxide and an oxide precursor that generates an oxide by hydrolysis.

18. The process according to claim 16, wherein said acid in step (c) is added in the form of a precursor which generates said acid and an oxide by hydolysis.

19. A process for preparing zeolitic catalysts in extruded form, which comprises:
   (a) preparing an aqueous alkaline mother liquor containing, as reagents for zeolite preparation, a silica source, optionally alumina and/or other metal oxide source and/or an organic templating agent;
   (b) hydrothermally treating said mother liquor thereby obtaining a suspension containing: - zeolite crystals, reagents of the zeolite preparation not transformed into zeolitic crystalline phase during the hydrothermal treatment and optionally oxides generated by them, optionally organic templating agent and optionally product generated by the decomposition of said sources of silica and alumina;
   (c) treating the suspension of zeolite crystals in the crystallization mother liquor containing the crystals with an aqueous acid solution to change the pH to a pH ranging from 3–8;
   (d) filtering or decanting the resulting mixture to separate the zeolite crystals in mixture with oxides generated by said reagents of the zeolite preparation not transformed into zeolitic crystalline phase;
   (e) drying the crystals;
   (f) calcining the crystals;
   (g) effecting an ion exchange in the zeolite crystals in an aqueous solution containing an acid or ammonium salt;
   (h) filtering or decanting the ion exchange zeolite crystals and subjecting the crystals to washing;
   (i) drying the crystals; and
   (j) calcining the crystals to remove ammonium ion therefrom in the event said ion exchange is conducted with ammonium salt and the acid form of the zeolite catalyst is required; and
   (k) extruding the crystals, optionally, in a mixture with a binder.

20. A process for preparing zeolitic catalyst in extruded form, which comprises:
   (a) preparing an aqueous alkaline mother liquor containing, as reagents for zeolite preparation, a silica source, optionally alumina and/or other metal oxide sources and/or an organic templating agent;
   (b) hydrothermally treating said mother liquor thereby obtaining a suspension containing: - zeolite crystals, reagents of the zeolite preparation not transformed into zeolitic crystalline phase during the hydrothermal treatment and optionally oxides generated by them, optionally organic templating agent and optionally product generated by the decomposition of said sources of silica and alumina;

(c) treating the alkaline suspension of zeolite crystals in the mother liquor with an acid until the suspension attains a pH ranging from 3 to 8;

(d) filtering or decanting the resulting mixture to isolate the zeolite crystals in mixture with oxides generated by said reagents of the zeolite preparation not transformed into zeolitic crystalline phase;

(e) exchanging the zeolite with an aqueous solution containing an acid or ammonium salt;

(f) filtering or decanting the zeolite crystals to effect separation thereof;

(g) drying the zeolite crystals; and (h) calcining the crystals to remove residual templating agent and ammonium ion in the event the ion exchange reaction is conducted with an ammonium salt, the zeolite product having a tridimensional large or extra-large pore system; and (i) extruding the crystals, optionally, in a mixture with a binder.

* * * * *